United States Statutory Invention Registration [19]

[11] Reg. Number: H638

Gavenonis et al. [43] Published: Jun. 6, 1989

[54] RAPID FLASH LAMP

[76] Inventors: Thomas L. Gavenonis, 544 Sand Hill Rd., R.D. #3, Montoursville, Lycoming County, Pa. 17754; William H. Hewitt, 24 G Acres Dr., Essex County, Bradford, Mass. 01830

[21] Appl. No.: 890,940

[22] Filed: Jul. 28, 1986

Related U.S. Application Data

[63] Continuation of Ser. No. 687,640, Dec. 31, 1984, abandoned.

[51] Int. Cl.[4] ..... F21K 5/02

[52] U.S. Cl. ..... 431/358; 431/362/360

[58] Field of Search ..... 431/365, 362, 358, 360

[56] References Cited

U.S. PATENT DOCUMENTS

| | | | |
|---|---|---|---|
| 2,395,600 | 2/1946 | Weisglass | 431/365 |
| 2,868,003 | 1/1959 | Albrecht | 431/362 |
| 3,312,085 | 4/1967 | Schilling et al. | 431/362 |
| 4,363,622 | 12/1982 | Van Laarhoven | 431/358 |
| 4,445,847 | 5/1984 | Schotz | 431/362 |

*Primary Examiner*—Deborah L. Kyle
*Assistant Examiner*—Michael J. Carone

[57] ABSTRACT

A method and apparatus for providing low peak time and pulse width actinic energy from a lamp by varying the input energy of a capacitive ignition circuit having relatively high voltage to the lamp. The lamp comprises a pair of electrodes disposed within a light transparent envelope in which a combustible and an oxidizing gas reaction combination is located. The combustible is preferably shredded zirconium which is in contact with and provides an electrical discharge path between the electrodes. The gas is preferably pressurized oxygen.

13 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RAPID FLASH LAMP

GOVERNMENT SUPPORT

The Government has rights in this invention pursuant to Subcontract 7746501 under prime contract W-7405-ENG-48 awarded by the Department of Energy.

This application is a continuation of application Ser. No. 687,640, filed Dec. 31, 1984, and now abandoned.

TECHNICAL FIELD

This invention is in the field of flash lamps and, more particularly, relates to flash lamps for use in providing photon energy or radiation for pumping lasers and/or for use in photo flash lamps or stroboscopic photography.

BACKGROUND ART

Photo flash lamps currently comprise in general lamps typically filled with an oxidizer, i.e., a gas that supports combustion such as oxygen and a combustible, such as aluminum-magnesium alloy or aluminum, magnesium or zirconium. Such flash lamps typically comprise hermetically sealed light transmitting glass envelopes which contain a filamentary combustible material, such as shredded aluminum or shredded zirconium foil immersed in a combustion supporting gas, such as oxygen.

In battery operated photo flash lamps, an electrical ignition system is included within the envelope of the lamp comprising a tungsten filament supported on a pair of lead-in wires having a quantity of ignition paste on the inner ends thereof adjacent to the filament. This type of lamp is operated by the passage of electric current through the lead-in wires. (See, for example, U.S. Pat. No. 3,895,902 issued July 22, 1975 to Broadt et al. entitled "Photo Flash Lamp".)

Another type of photo flash lamp comprises the percussive type, such as described in U.S. Pat. No. 3,535,063 which includes a mechanically activated primer sealed in one end of the lamp envelope. The ignition system may comprise a metal tube extending from the lamp envelope and a charge of fulminating material on a wire supported in the tube. Operation of the percussive photo flash lamp is initiated by an impact onto the tube to cause deflagration of the fulminating material up through the tube to ignite the combustible disposed in the lamp envelope.

Another type of photo flash lamp is the piezo-electric ignited flash lamp in which a high voltage in the neighborhood of 2,000 Volts is produced by a piezo-electric device to cause a spark to be emitted which ignites the combustible material, i.e, the primer within the lamp envelope. This is contrasted with battery ignited-type photo flash lamp which utilizes a relatively high current in the neighborhood of amperes to ignite the combustible.

All of these igniter systems for the shredded combustible photo flash lamps suffer from the problem that a significant delay exists between the time the igniter is enabled and the photo flash occurs. A need exists for flash lamps which create a substantially rapid and simultaneous ignition of the combustible.

One advantage for such a flash lamp in photo applications, would be to avoid the necessity of delaying shutter opening until a fixed time after the lamp is ignited.

Present photo flash lamps require an "M synchronization" setting for this purpose.

DISCLOSURE OF THE INVENTION

In the apparatus of the present invention, a high voltage, high current capacitive-type ignition system is provided. In this lamp, a transparent envelope encloses a shredded combustible conductively coupled between a pair of electrodes. A capacitor is discharged through the combustible at relatively high voltage and high current to cause rapid simultaneous ignition of substantially all the combustible threads in the envelope. In this fashion, a discharge occurs across the longitudinal gap between the electrodes. The conductive shreds of the combustible form the path of the discharge. A spark occurs at each non-contacting interface of shreds crossing throughout the lamp ignite resulting in rapid simultaneous ignition of the combustible and consequent low "peak time"; i.e., time between ignition and peak actinic output. Where a spark occurs, ignition is begun. Additionally, because of the relatively small size of the discrete fuel shreds, the energy of the electrical pulse is sufficient to energize some shreds to the point of incandescence. This causes undelayed chemical combination of the fuel and reactive oxidizer.

This is in contrast to the prior art structures in which ignition occurs at one end of the lamp and then progresses in a step-wise or burning fashion along the shreds in the lamp from one end to the other over a period of time.

BEST MODE OF CARRYING OUT THE INVENTION

Figure 1:
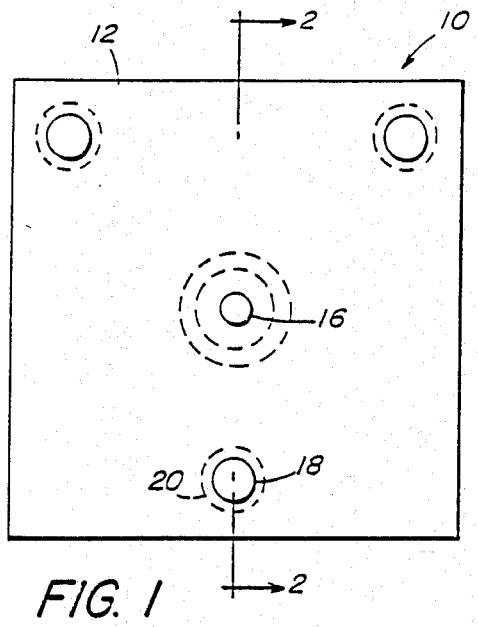
FIG. 1 is an end view of a flash lamp in accordance with the invention.
Figure 2:
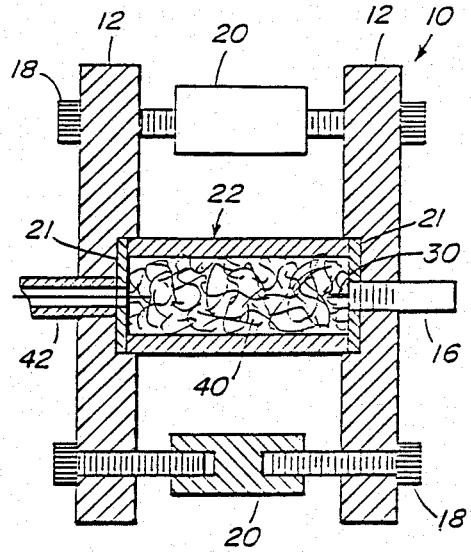
FIG. 2 is a section along lines 2—2 of FIG. 1.

Referring now to FIGS. 1 and 2, there is shown a lamp 10 comprising a quartz tube 22 mounted between two brass endplates 12. Three phenolic "stand-off" insulators 20 are spaced 120° apart around the inner periphery of 3 inch square by ⅜ inch thick end plates 12. Screw bolts 18 at each end of the plates hold the insulators 20 and end plates 12 in place. Teflon washers 21 provide a hermetic seal between the end plates 12 and the open ends of quartz tube 22.

The tube is filled with shredded zirconium 40 and a gaseous oxidizer, such as oxygen. A high voltage connector 16 is inserted through a hole in washer 21. Connector 16 is provided with a pointed discharge element 30 on the inner or tube side of the connector 16. Oxygen is pumped into tube 22 via tubing 42 which may then be sealed by conventional means.

Figure 3:
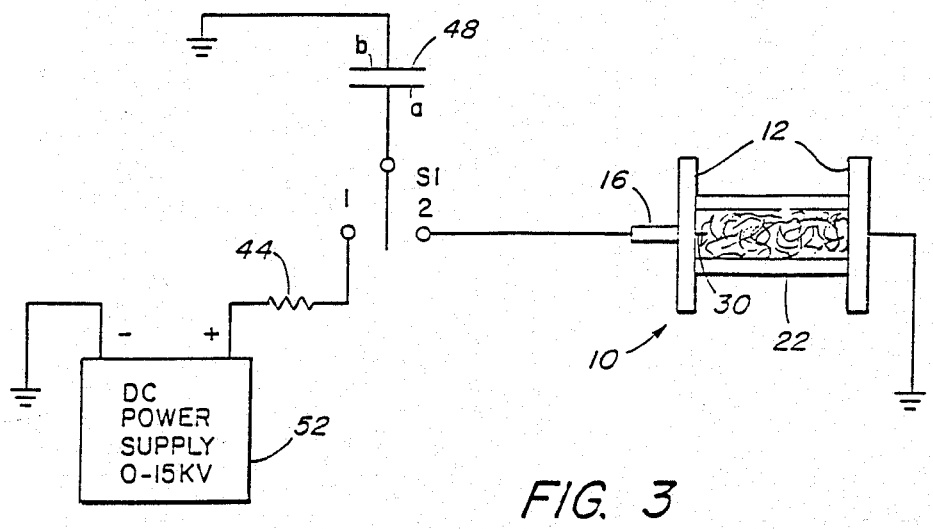
FIG. 3 is a schematic representation of the lamp and ignition circuit of the invention.

The length of the lamp may very depending upon the desired application. We have made lamps of 3-inch to 4 feet in length. Even in such relatively long lengths, these lamps have operated satisfactorily. In operation, the high voltage connector electrode 16 of the lamp 10 is coupled through switch $S_1$ to side "a" of capacitor 48, as shown in FIG. 3 when $S_1$ is in the 2 position. The other electrode end plate 12 is grounded. The "b" side of capacitor 48 is also grounded.

Initially, switch $S_1$ is switched to position 1. In this position 0–15 KV volts from D.C. power supply 52 is coupled through a two megohm resistor 44 to side "a"

of 0.1 to 2 microfarad capacitor 48 for a sufficient time to allow capacitor 48 to fully charge. Upon moving switch $S_1$ to position 2, the energy stored in capacitor 48 is coupled into the flashlamp 10.

We have found that the time it takes to achieve peak actinic output from the moment the igniter circuit is energized, i.e., the "peak time" can be greatly reduced by increasing the input energy and have thereby achieved actinic pulses of shorter time duration and more rapid "peak time" than heretofore known.

With the capacitive discharge ignition circuit and lamp of the invention, the "peak time" for combustible gas reactions, such as, zirconium-oxygen reactions can be decreased by increasing the input energy to the reaction system.

The energy available from a capacitive discharge is equal to one-half of the product of the capacitance times the voltage squared:

$$E=\tfrac{1}{2}CV^2$$

For example, a 2-microfarad ($\mu$f) capacitor charged to 10,000 Volts has 100 joules of electrical energy stored. The rapid release of this energy through the zirconium-oxygen fuel constitutes the input energy. Note that energy can be increased in two ways:

1. by maintaining capacitance and increasing voltage, or
2. by maintaining voltage and increasing capacitance.

However, the energy increases as the second power (square) of the voltage but only linearly with capacitance. Table I below lists the results of experiments conducted in which Energy (E) was held constant (Part A) and Voltage (V) and Capacitance (C) varied and in which C was held constant while V and hence E was increased (Part B) and lastly, in which V was held constant while C and hence E was increased (Part C).

TABLE I

| | | | Peak Time msec. | FWHM* msec. | Output-Spatially Integrated joules |
|---|---|---|---|---|---|
| PART A | C($\mu$f) | KV | | | |
| E = Constant | 0.1 | 10.6 | 3.6 | 10.0 | 203.0 |
| = 5.625 J | 0.25 | 6.7 | 3.8 | 11.0 | 258.4 |
| | 0.5 | 4.8 | 3.0 | 11.0 | 305.5 |
| | 1.0 | 3.4 | 3.5 | — | 269.8 |
| | 2.0 | 2.4 | 3.6 | 11.0 | 274.4 |
| PART B | KV | E(j) | | | |
| C = Constant | 2.0 | 1.0 | 4.5 | 12.0 | 268.4 |
| = 0.5 $\mu$f | 4.0 | 4.0 | 3.5 | 13.0 | 298.4 |
| | 6.0 | 9.0 | 2.25 | — | 220.2 |
| | 8.0 | 16.0 | 1.7 | 10.0 | 178.0 |
| | 10.0 | 25.0 | 0.8 | 3.0 | 92.4 |
| PART C | C($\mu$f) | E(j) | | | |
| V = Constant | 0.1 | 1.25 | 4.0 | 10.0 | 282.9 |
| = 5 KV | 0.25 | 3.125 | 4.25 | 9.0 | 300.4 |
| | 0.5 | 6.25 | 2.0 | 12.0 | 226.5 |
| | 1.0 | 12.25 | 2.25 | — | 178.0 |
| | 2.0 | 25.0 | 0.9 | 2.5 | 99.6 |
| PART D | | | | | |
| Flash Bar Lamp (3 V. ignition) | | | 19–21 | 20.0 | 106.0 |

*FWHM indicates the Full Width at Half Maximum of the optical output curves. The curves are the photographed oscilloscope traces of the voltage produced in a phototransistor when light from the reaction was incident on the phototransistor at a distance of four meters.

Part A of Table I shows that "peak time" and FWHM do not change significantly if the energy is held constant but the voltage and capacitance is changed. Part B of Table I shows that with constant and increased V, the "peak time" decreases. Part C of Table I shows that as voltage is held constant and the capacitance increased, such that the energy input is increased, the "peak time" and FWHM decrease. In the experimental arrangement utilized for the reactions summarized in Table I, a quartz tube 4.9 cm. long and 1.27 cm. ID$\times$1.905 cm. OD, was used. This resulted in a five-cubic centimeter internal lamp volume. The lamp tube was filled with 60 mg. $\pm$0.5 shredded zirconium with dimensions of 4.0"$\times$0.00095"$\times$0.001". Electrical continuity through the zirconium was ensured by establishing contact of the zirconium shreds to both the probe 30 and the opposite grounded endplate 12. A capacitive discharge power supply 52 variable from 0–15 KV DC was employed. Oxygen pressure for all reactions was 264 cm. $\pm$1.

The results of Table I should be contrasted with prior art zirconium-oxygen reactions in flashlamps. Such lamps have "peak times" between 7 and 17 msec., depending on conditions of the shredded zirconium, lamp volume, oxygen pressure, and other considerations. These lamps also have long tails on their output curves. These tails result in actual flash durations of 50 msec. or more. Additionally, the data for Flash Bar lamps is shown in Part D of Table I. These lamps are filament-ignited and there is a period of "dark time" prior to bulk zirconium ignition where no significant optical output occurs. This time typically ranges from 3–5 msec. It is during this time that the filament heats, melts, and ignites the priming composition of the lamp. Considerations such as these render such lamps unacceptable for X-sync. photography where the camera shutter and flash ignition pulses occur simultaneously. Historically, such lamps have been used with M-sync. cameras where there is a 17-msec. delay between flash ignition pulse and shutter operation. This is to ensure that the shutter is open during the peak optical output. Additionally, the FWHM of such prior art photolamps varies from 15–25 msecs. For a typical X-sync. shutter speed of 1/60 sec. (16.7 msec.) much of the optical output is wasted as the shutter is closing at the time of peak optical output.

As shown in Table I, we have been able to achieve peak times as low as 800 microseconds=0.8 milliseconds and FWHM's as low as 2,500 microseconds=2.5 milliseconds, which are well within requirements for X-sync. photography. Furthermore, we have done so with lamp lengths as long as 4 feet, which is believed to be beyond the capability of conventional flash lamps which operate at relatively low voltage or current.

Equivalent

We have completed a description of one preferred embodiment of the invention. Those skilled in the art doubtless will recognize or be able to ascertain without undue experimentation other equivalents to the method and apparatus herein described. For example, other combustible-gas combinations are envisioned for use in the lamp of the invention, such as, yttrium-fluorine, yttrium-oxygen difluoride, yttrium-oxygen and magnesium with oxygen difluoride or fluorine. Such equivalents are therefore intended to be covered by the following claims:

We claim:

1. A primer-less rapid flash lamp system comprising:
(a) a light transparent envelope;
(b) a pair of electrodes spaced apart on or within said envelope;

(c) a pressurized gas for supporting combustion within said envelope;

(d) a shredded non-adhesive electrically conductive combustible means, in electrically conductive contact with each electrode, for providing an electrically conductive path between said electrodes to cause a rapid simultaneous ignition of substantially all shreds of the combustible means solely upon application of a substantially high energy pulse to one of said electrodes without the use of a primer; and (e) means for applying said high energy pulse to said electrodes.

2. The lamp of claim 1 wherein one of said electrodes comprises a high voltage connector with a discharge probe extending into said envelope.

3. The lamp of claim 1 wherein the combustible is zirconium, yttrium or magnesium.

4. The lamp of claim 3 wherein the gas is oxygen, or fluorine.

5. The lamp system of claim 4 wherein the gas is pressurized to about 2640 mm-Hg.

6. The lamp of claim 1 wherein the envelope is a quartz cylinder.

7. The lamp of claim 1 wherein the lamp length is between about 3 inches to 4 feet.

8. A primer-less low peak time flash lamp system for producing peak actinic output substantially simultaneously with ignition comprising:

(a) a lamp having a pair of electrodes disposed on or within a light transparent hermetically sealed envelope;

(b) a non-adhering shredded combustible within said envelope forming an electrically conductive contact between said electrodes;

(c) a gas oxidizer within said envelope;

(d) igniter means for providing a high energy level electrical pulse across said electrodes to directly ignite said combustible without the intervention of other means, such as a primer, and thereby create a flash of light by substantially simultaneously igniting the shreds of said combustible.

9. The system of claim 8 in which the igniter means comprises a DC power supply coupled to a capacitor.

10. The system of claim 9 wherein the DC power supply provides a voltage of at least about 15 KV.

11. The system of claim 9 wherein the capacitor has a capacitance in the range of from about 0.5 to 2.0 microfarads.

12. The lamp system of claim 8 wherein the electrodes are spaced apart by at least 8 cm and the energy is at least 5 Joules.

13. A primer-less rapid flash lamp system comprising:

(a) a light transparent envelope;

(b) a pair of electrodes spaced apart on or within said envelope;

(c) a pressurized gas for supporting combustion within said envelope;

(d) a shredded non-adhesive electrically conductive combustible means, in electrically conductive contact with each electrode, for providing an electrically conductive path between said electrodes to cause a rapid simultaneous ignition of substantially all shreds of the combustible means solely upon application of a substantially high energy pulse in excess of 1 Joule to one of said electrodes without the use of a primer; and (e) means for applying said high energy pulse to said electrodes.

* * * * *